(12) United States Patent
Nomaru

(10) Patent No.: US 9,186,750 B2
(45) Date of Patent: Nov. 17, 2015

(54) LASER PROCESSING APPARATUS

(71) Applicant: Disco Corporation, Tokyo (JP)

(72) Inventor: Keiji Nomaru, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 357 days.

(21) Appl. No.: 13/910,733

(22) Filed: Jun. 5, 2013

(65) Prior Publication Data

US 2013/0334186 A1 Dec. 19, 2013

(30) Foreign Application Priority Data

Jun. 19, 2012 (JP) ................................ 2012-138049

(51) Int. Cl.
| | |
|---|---|
| *B23K 26/06* | (2014.01) |
| *B23K 26/067* | (2006.01) |
| *B23K 26/02* | (2014.01) |
| *B23K 26/04* | (2014.01) |
| *B23K 26/08* | (2014.01) |
| *B23K 26/36* | (2014.01) |

(52) U.S. Cl.
CPC .............. *B23K 26/02* (2013.01); *B23K 26/041* (2013.01); *B23K 26/0676* (2013.01); *B23K 26/0853* (2013.01); *B23K 26/0869* (2013.01); *B23K 26/367* (2013.01)

(58) Field of Classification Search
CPC .. B23K 26/06; B23K 26/0643; B23K 26/067; B23K 26/0676
USPC ........ 219/121.68, 121.69, 121.77; 250/429.1, 250/492.2; 438/33, 113, 463
See application file for complete search history.

(56) References Cited

U.S. PATENT DOCUMENTS

| | | | | |
|---|---|---|---|---|
| 4,713,518 | A  * | 12/1987 | Yamazaki et al. | 219/121.85 |
| 5,498,851 | A  * | 3/1996 | Hayashi et al. | 219/121.7 |
| 8,939,614 | B2 * | 1/2015 | Park et al. | 362/331 |
| 2008/0290078 | A1* | 11/2008 | Nomaru et al. | 219/121.67 |
| 2011/0011840 | A1* | 1/2011 | Park et al. | 219/121.68 |
| 2013/0334185 | A1* | 12/2013 | Nomaru | 219/121.82 |

FOREIGN PATENT DOCUMENTS

| | | |
|---|---|---|
| JP | 2005-142398 | 6/2005 |
| JP | 2011-156551 | 8/2011 |

\* cited by examiner

*Primary Examiner* — Samuel M Heinrich
(74) *Attorney, Agent, or Firm* — Greer Burns & Crain Ltd.

(57) ABSTRACT

A laser processing apparatus includes a laser beam branching mechanism provided between a laser oscillator and a focusing unit. The branching mechanism includes a branching unit for branching a laser beam into a plurality of laser beams. The branching unit includes a half-wave plate for 45° rotating the polarization plane of the laser beam. A first polarization beam splitter separates the laser beam passed through the half-wave plate into P polarized light and S polarized light. A first mirror reflects the P polarized light and a second mirror reflects the S polarized light. A second polarization beam splitter leads the reflected P polarized light and the reflected S polarized light to different optical paths extending in the same direction, and an angle adjusting mechanism adjusts the angle of reflection of at least one of the P polarized light and the S polarized light.

2 Claims, 8 Drawing Sheets

LASER PROCESSING APPARATUS

BACKGROUND OF THE INVENTION

1. Field of the Invention

The present invention relates to a laser processing apparatus suitable for formation of a laser processed groove by applying a laser beam along a street formed on the front side of a workpiece such as a semiconductor wafer.

2. Description of the Related Art

In a semiconductor device fabrication process, a multilayer film composed of an insulating film and a functional film is formed on the front side of a semiconductor substrate such as a silicon substrate, and a plurality of devices such as ICs and LSIs are formed like a matrix from this multilayer film, thus obtaining a semiconductor wafer having the plural devices. The plural devices are partitioned by a plurality of division lines called streets formed on the front side of the semiconductor wafer. The semiconductor wafer is divided along these streets to obtain the individual devices.

Division of the semiconductor wafer along the streets is usually performed by using a cutting apparatus called a dicing saw. This cutting apparatus includes a chuck table for holding the semiconductor wafer as a workpiece, cutting means for cutting the semiconductor wafer held on the chuck table, and moving means for relatively moving the chuck table and the cutting means. The cutting means includes a spindle adapted to be rotated at high speeds and a cutting blade mounted on the spindle. The cutting blade is composed of a disk-shaped base and an annular cutting edge mounted on a side surface of the base along the outer circumference thereof. The cutting edge is formed by bonding diamond abrasive grains having a grain size of about 3 µm by electroforming so that the thickness of the cutting edge becomes 20 to 30 µm, for example.

In recent years, a semiconductor wafer intended to improve the processing performance of devices such as ICs and LSIs has been put into practical use. This semiconductor wafer is composed of a semiconductor substrate such as a silicon substrate and a multilayer film formed on the front side of the semiconductor substrate. The multilayer film is composed of a low-permittivity insulator film (Low-k film) and a functional film formed on the Low-k film, the functional film forming a plurality of circuits. Thus, the semiconductor devices are formed from the multilayer film. Examples of the Low-k film includes an inorganic film of SiOF, BSG (SiOB), etc. and an organic film such as a polymer film of polyimide, parylene, etc. Further, there is also in practical use a semiconductor wafer having a configuration such that a plurality of metal patterns called test element group (TEG) are partially provided on the streets of the semiconductor wafer to test the function of the circuits through the metal patterns before dividing the semiconductor wafer.

The Low-k film or the test element group (TEG) mentioned above is different in material from the semiconductor substrate, so that it is difficult to cut the semiconductor substrate together with the Low-k film or the test element group (TEG) by using the cutting blade. That is, the Low-k film is very brittle like mica. Accordingly, when the semiconductor wafer having the Low-k film is cut along the streets by using the cutting blade, there arises a problem such that the Low-k film may be separated and this separation may reach the devices to cause fatal damage to the devices. Further, the test element group (TEG) is formed of metal. Accordingly, when the semiconductor wafer having the test element group (TEG) is cut along the streets, burrs may be produced. To solve these problems, there has been proposed a processing method including the steps of applying a pulsed laser beam along the streets on the semiconductor wafer to thereby remove the Low-k film forming the streets or the test element group (TEG) provided on the streets and next cutting the area where the Low-k film or the test element group (TEG) is now absent by using the cutting blade (see Japanese Patent Laid-Open No. 2005-142398, for example).

However, in the case of removing the Low-k film or the test element group (TEG) by applying a pulsed laser beam along the streets of the semiconductor wafer as in the processing method disclosed in Japanese Patent Laid-Open No. 2005-142398, it is necessary to form a laser processed groove having a width larger than the thickness of the cutting blade along each street. Accordingly, in the case that the focused spot diameter of the laser beam is about 10 µm, a laser beam applying step of applying the laser beam along each street must be performed plural times as shifting the focused spot along the width of each street, causing a reduction in productivity.

To solve this problem, there has been proposed a laser processing apparatus as described in Japanese Patent Laid-Open No. 2011-156551. This laser processing apparatus has a configuration such that a laser beam is branched into a plurality of laser beams to thereby form a plurality of focused spots (focal points), which are arranged along the width of each street to form a wide laser processed groove at a stroke, so that the Low-k film or the test element group (TEG) can be efficiently removed.

SUMMARY OF THE INVENTION

In the technique described in Japanese Patent Laid-Open No. 2011-156551, however, it is difficult to adjust the spacing between the plural focused spots (focal points) of the plural laser beams, so that the plural focused spots (focal points) cannot be positioned so as to fall within the range corresponding to the width of each street.

It is therefore an object of the present invention to provide a laser processing apparatus which can easily adjust the spacing between the plural focused spots (focal points) of the plural laser beams.

In accordance with an aspect of the present invention, there is provided a laser processing apparatus including a chuck table for holding a workpiece; laser beam applying means for applying a laser beam to the workpiece held on the chuck table, the laser beam applying means including laser beam oscillating means for oscillating a laser beam, focusing means for focusing the laser beam oscillated by the laser beam oscillating means and applying the laser beam focused to the workpiece held on the chuck table, and a laser beam branching mechanism provided between the laser beam oscillating means and the focusing means for branching the laser beam oscillated by the laser beam oscillating means into a plurality of laser beams; and feeding means for relatively moving the chuck table and the laser beam applying means in a feeding direction; the laser beam branching mechanism including a branching unit for branching the laser beam oscillated by the laser beam oscillating means into the plurality of laser beams; the branching unit including a half-wave plate for 45° rotating the polarization plane of the laser beam oscillated by the laser beam oscillating means, a first polarization beam splitter for separating the laser beam passed through the half-wave plate into P polarized light and S polarized light, a first mirror for reflecting the P polarized light obtained by the first polarization beam splitter, a second mirror for reflecting the S polarized light obtained by the first polarization beam splitter, a second polarization beam splitter for leading the P polarized light reflected by the first mirror and the S polarized light reflected by the second mirror to different optical paths extending in the same direction, and angle adjusting means for adjusting the angle of reflection of at least one of the P polarized light and the S polarized light to be reflected by the first and second mirrors; whereby the angle of reflection of at least one of the P polarized light and the S polarized light to be reflected by the first and second mirrors is adjusted by the angle adjusting means to thereby adjust the spacing between the focal points of the plurality of laser beams formed by the P polarized light and the S polarized light to be focused by the focusing means.

Preferably, the laser beam branching mechanism includes a plurality of branching units, the P polarized light and the S polarized light passed through the upstream one of the plurality of branching units being 45° rotated in polarization plane by the half-wave plate of the next one of the plurality of branching units, the P polarized light in the next branching unit being further branched into P polarized light and S polarized light to be introduced into the focusing means, the S polarized light in the next branching unit being further branched into P polarized light and S polarized light to be introduced into the focusing means.

In the laser processing apparatus according to the present invention, the laser beam branching mechanism provided between the laser beam oscillating means and the focusing means for branching the laser beam oscillated by the laser beam oscillating means into a plurality of laser beams includes the branching unit for branching the laser beam oscillated by the laser beam oscillating means into the plural laser beams. The branching unit includes the half-wave plate for 45° rotating the polarization plane of the laser beam oscillated by the laser beam oscillating means, the first polarization beam splitter for separating the laser beam passed through the half-wave plate into P polarized light and S polarized light, the first mirror for reflecting the P polarized light obtained by the first polarization beam splitter, the second mirror for reflecting the S polarized light obtained by the first polarization beam splitter, the second polarization beam splitter for leading the P polarized light reflected by the first mirror and the S polarized light reflected by the second mirror to different optical paths extending in the same direction, and the angle adjusting means for adjusting the angle of reflection of at least one of the P polarized light and the S polarized light to be reflected by the first and second mirrors. The angle of reflection of at least one of the P polarized light and the S polarized light to be reflected by the first and second mirrors is adjusted by the angle adjusting means to thereby adjust the spacing between the focal points of the plural laser beams formed by the P polarized light and the S polarized light to be focused by the focusing means. Accordingly, the spacing between the focused spots (focal points) of the plural laser beams can be easily adjusted.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
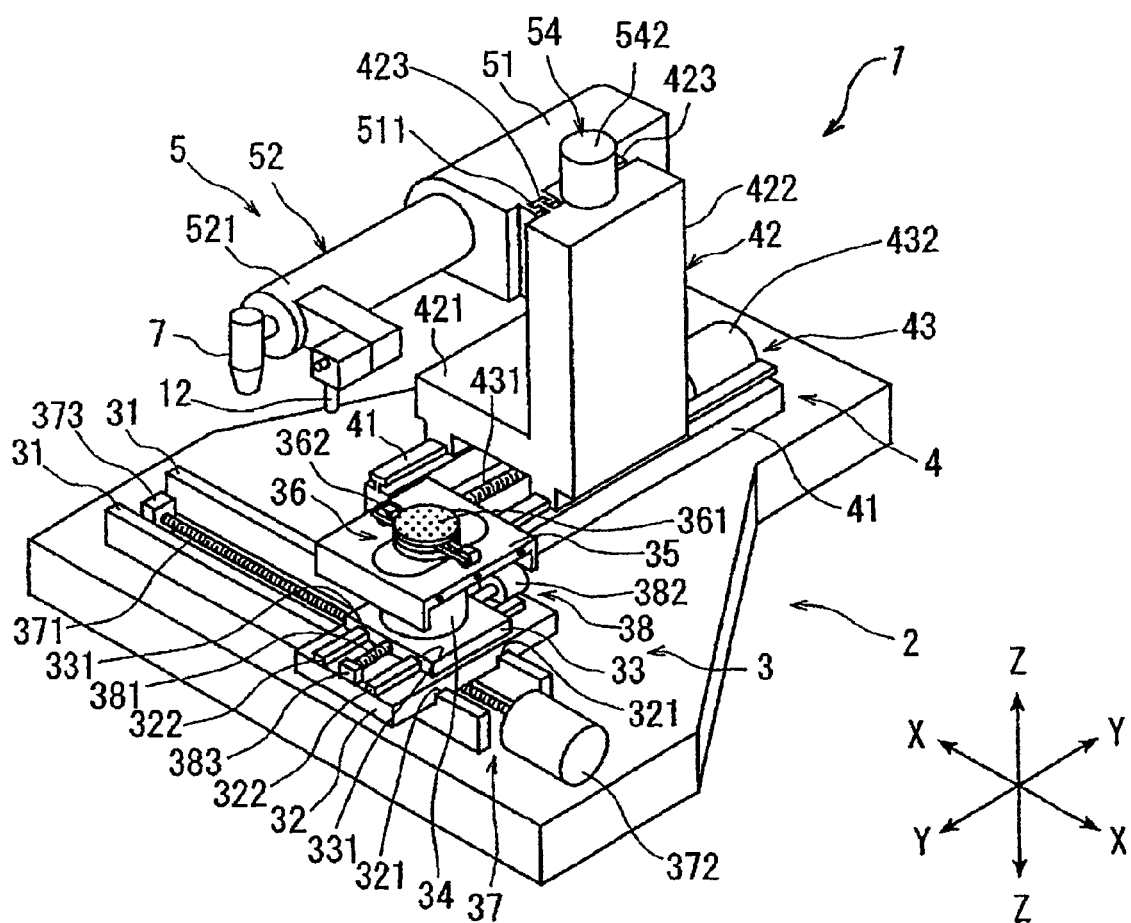
FIG. 1 is a perspective view of a laser processing apparatus according to the present invention.

A preferred embodiment of the laser processing apparatus according to the present invention will now be described in detail with reference to the attached drawings. FIG. 1 is a perspective view of a laser processing apparatus 1 according to a preferred embodiment of the present invention. The laser processing apparatus 1 shown in FIG. 1 includes a stationary base 2, a chuck table mechanism 3 for holding a workpiece, the chuck table mechanism 3 being provided on the stationary base 2 so as to be movable in a feeding direction (X direction) shown by an arrow X, a laser beam applying unit supporting mechanism 4 provided on the stationary base 2 so as to be movable in an indexing direction (Y direction) shown by an arrow Y perpendicular to the X direction, and a laser beam applying unit 5 provided on the laser beam applying unit supporting mechanism 4 so as to be movable in a focal position adjusting direction (Z direction) shown by an arrow Z.

The chuck table mechanism 3 includes a pair of guide rails 31 provided on the stationary base 2 so as to extend parallel to each other in the X direction, a first slide block 32 provided on the guide rails 31 so as to be movable in the X direction, a second slide block 33 provided on the first slide block 32 so as to be movable in the Y direction, a support table 35 supported by a cylindrical member 34 standing on the second slide block 33, and a chuck table 36 as workpiece holding means. The chuck table 36 has a workpiece holding surface 361 formed of a porous material. A workpiece such as a disk-shaped semiconductor wafer is adapted to be held under suction on the workpiece holding surface 361 by operating suction means (not shown). The chuck table 36 is rotatable by a pulse motor (not shown) provided in the cylindrical member 34. Further, the chuck table 36 is provided with clamps 362 for fixing an annular frame supporting the wafer as described later.

The lower surface of the first slide block 32 is formed with a pair of guided grooves 321 for slidably engaging the pair of guide rails 31 mentioned above. A pair of guide rails 322 are provided on the upper surface of the first slide block 32 so as to extend parallel to each other in the Y direction. Accordingly, the first slide block 32 is movable in the X direction along the guide rails 31 by the slidable engagement of the guided grooves 321 with the guide rails 31. The chuck table mechanism 3 further includes feeding means 37 for moving the first slide block 32 in the X direction along the guide rails 31. The feeding means 37 includes an externally threaded rod 371 extending parallel to the guide rails 31 so as to be interposed therebetween and a pulse motor 372 as a drive source for rotationally driving the externally threaded rod 371. The externally threaded rod 371 is rotatably supported at one end thereof to a bearing block 373 fixed to the stationary base 2 and is connected at the other end to the output shaft of the pulse motor 372 so as to receive the torque thereof. The externally threaded rod 371 is engaged with a tapped through hole formed in an internally threaded block (not shown) projecting from the lower surface of the first slide block 32 at a central portion thereof. Accordingly, the first slide block 32 is moved in the X direction as the feeding direction along the guide rails 31 by operating the pulse motor 372 to normally or reversely rotate the externally threaded rod 371.

The lower surface of the second slide block 33 is formed with a pair of guided grooves 331 for slidably engaging the pair of guide rails 322 provided on the upper surface of the first slide block 32 as mentioned above. Accordingly, the second slide block 33 is movable in the Y direction along the guide rails 322 by the slidable engagement of the guided grooves 331 with the guide rails 322. The chuck table mechanism 3 further includes first indexing means 38 for moving the second slide block 33 in the Y direction along the guide rails 322. The first indexing means 38 includes an externally threaded rod 381 extending parallel to the guide rails 322 so as to be interposed therebetween and a pulse motor 382 as a drive source for rotationally driving the externally threaded rod 381. The externally threaded rod 381 is rotatably supported at one end thereof to a bearing block 383 fixed to the upper surface of the first slide block 32 and is connected at the other end to the output shaft of the pulse motor 382 so as to receive the torque thereof. The externally threaded rod 381 is engaged with a tapped through hole formed in an internally threaded block (not shown) projecting from the lower surface of the second slide block 33 at a central portion thereof. Accordingly, the second slide block 33 is moved in the Y direction as the indexing direction along the guide rails 322 by operating the pulse motor 382 to normally or reversely rotate the externally threaded rod 381.

The laser beam applying unit supporting mechanism 4 includes a pair of guide rails 41 provided on the stationary base 2 so as to extend parallel to each other in the Y direction and a movable support base 42 provided on the guide rails 41 so as to be movable in the Y direction. The movable support base 42 is composed of a horizontal portion 421 slidably supported to the guide rails 41 and a vertical portion 42 extending vertically upward from the upper surface of the horizontal portion 421. Further, a pair of guide rails 423 are provided on one side surface of the vertical portion 422 so as to extend parallel to each other in the Z direction. The laser beam applying unit supporting mechanism 4 further includes second indexing means 43 for moving the movable support base 42 in the Y direction along the guide rails 41. The second indexing means 43 includes an externally threaded rod 431 extending parallel to the guide rails 41 so as to be interposed therebetween and a pulse motor 432 as a drive source for rotationally driving the externally threaded rod 431. The externally threaded rod 431 is rotatably supported at one end thereof to a bearing block (not shown) fixed to the stationary base 2 and is connected at the other end to the output shaft of the pulse motor 432 so as to receive the torque thereof. The externally threaded rod 431 is engaged with a tapped through hole formed in an internally threaded block (not shown) projecting from the lower surface of the horizontal portion 421 at a central portion thereof. Accordingly, the movable support base 42 is moved in the Y direction as the indexing direction along the guide rails 41 by operating the pulse motor 432 to normally or reversely rotate the externally threaded rod 431.

The laser beam applying unit 5 includes a unit holder 51 and laser beam applying means 52 mounted to the unit holder 51. The unit holder 51 is formed with a pair of guided grooves 511 for slidably engaging the pair of guide rails 423 provided on the vertical portion 422 of the movable support base 42. Accordingly, the unit holder 51 is supported to the movable support base 42 so as to be movable in the Z direction by the slidable engagement of the guided grooves 511 with the guide rails 423.

The laser beam applying unit 5 further includes focal position adjusting means 54 for moving the unit holder 51 along the guide rails 423 in the Z direction. The focal position adjusting means 54 includes an externally threaded rod (not shown) extending parallel to the guide rails 423 so as to be interposed therebetween and a pulse motor 542 as a drive source for rotationally driving this externally threaded rod. Accordingly, the unit holder 51 and the laser beam applying means 52 are moved in the Z direction as the focal position adjusting direction along the guide rails 423 by operating the pulse motor 542 to normally or reversely rotate this externally threaded rod. In this preferred embodiment, when the pulse motor 542 is normally operated, the laser beam applying means 52 is moved upward, whereas when the pulse motor 542 is reversely operated, the laser beam applying means 52 is moved downward.

Figure 2:
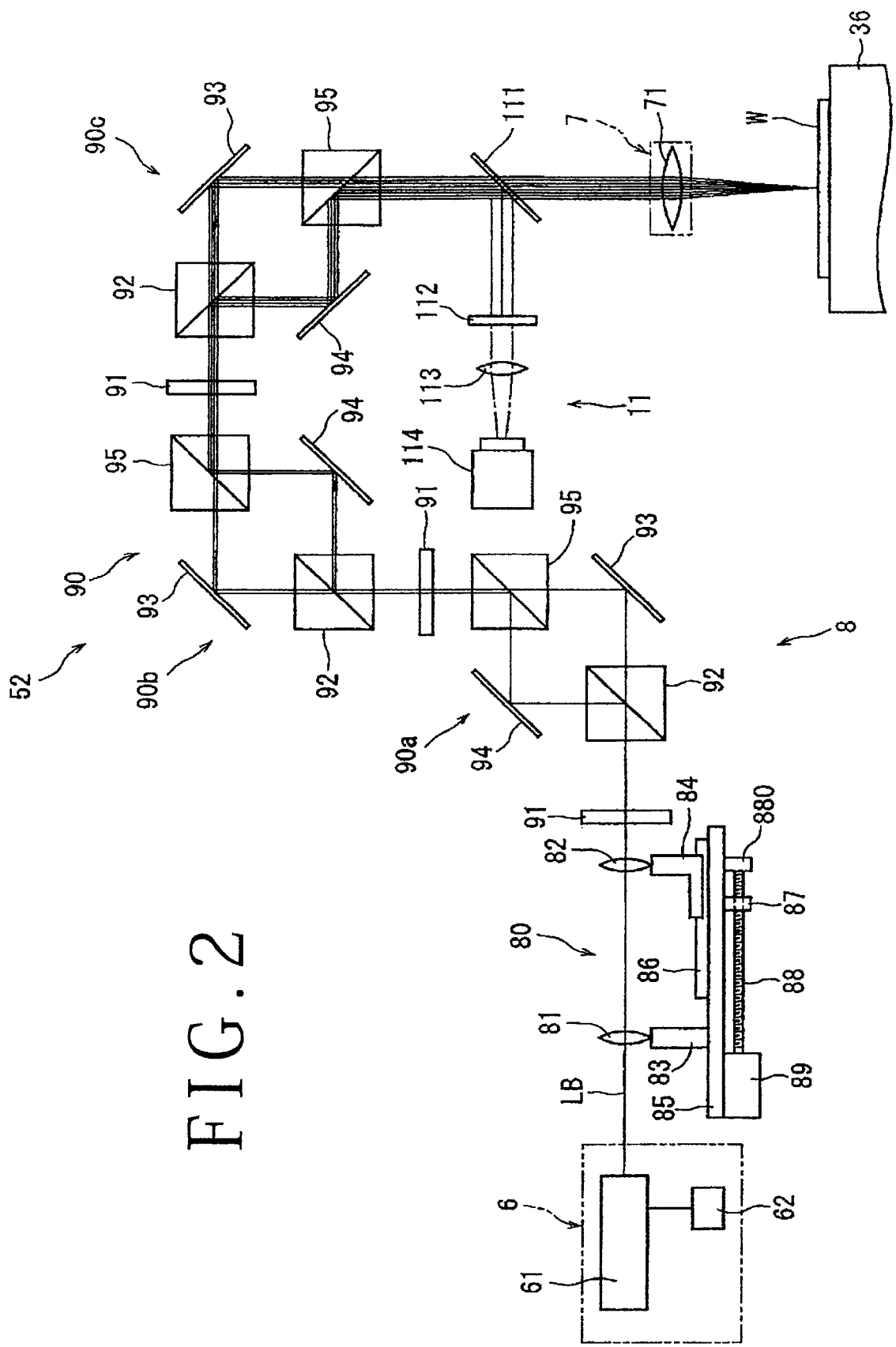
FIG. 2 is a block diagram showing the configuration of laser beam applying means included in the laser processing apparatus shown in FIG. 1.

As shown in FIG. 1, the laser beam applying means 52 includes a cylindrical casing 521 fixed to the unit holder 51 so as to extend in a substantially horizontal direction. As shown in FIG. 2, the laser beam applying means 52 includes pulsed laser beam oscillating means 6 provided in the casing 521, focusing means 7 for focusing a pulsed laser beam oscillated by the pulsed laser beam oscillating means 6 and applying the pulsed laser beam to a workpiece W held on the chuck table 36, and a laser beam branching mechanism 8 provided between the pulsed laser beam oscillating means 6 and the focusing means 7 for branching the pulsed laser beam oscillated by the pulsed laser beam oscillating means 6 into a plurality of laser beams. The focusing means 7 includes a focusing objective lens 71. As shown in FIG. 1, the focusing means 7 is provided at the front end of the casing 521.

The pulsed laser beam oscillating means 6 is composed of a pulsed laser oscillator 61 such as a YAG laser oscillator or a YVO4 laser oscillator and repetition frequency setting means 62 connected to the pulsed laser oscillator 61. The pulsed laser oscillator 61 functions to oscillate a pulsed laser beam (LB) having a predetermined frequency set by the repetition frequency setting means 62. The repetition frequency setting means 62 functions to set the repetition frequency of the pulsed laser beam to be oscillated by the pulsed laser oscillator 61. The pulsed laser oscillator 61 and the repetition frequency setting means 62 of the pulsed laser beam oscillating means 6 are controlled by control means to be hereinafter described.

Figure 3:
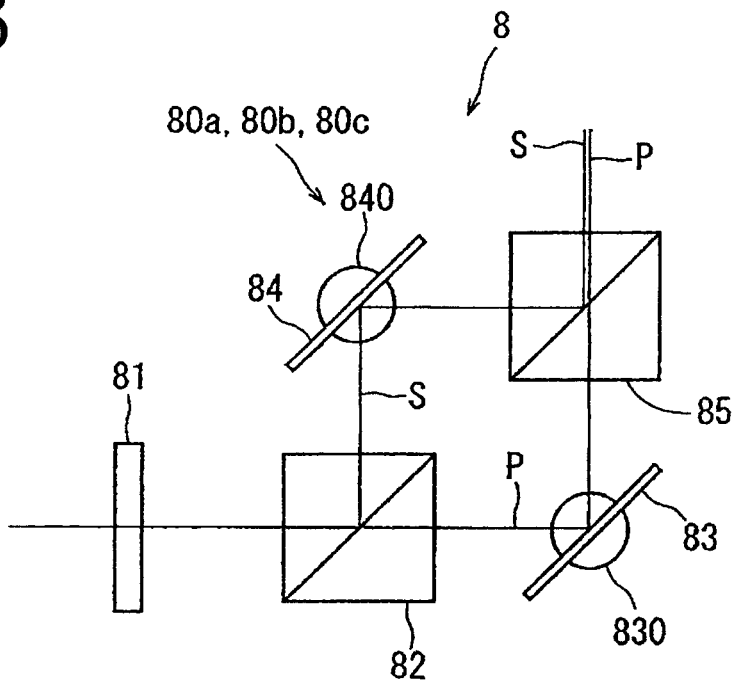
FIG. 3 is a schematic diagram for illustrating a branching unit constituting the laser beam applying means shown in FIG. 2.

Referring again to FIG. 2, the laser beam branching mechanism 8 is composed of a first branching unit 80a, a second branching unit 80b, and a third branching unit 80c, all of which have the same configuration. That is, each of the first, second, and third branching units 80a, 80b, and 80c includes a half-wave plate 81, first polarization beam splitter 82, first mirror 83, second mirror 84, and second polarization beam splitter 85. The operation of the first to third branching units 80a to 80c will now be described with reference to FIG. 3. The polarization plane of the laser beam incident on the half-wave plate 81 is rotated 45° by the half-wave plate 81. Thereafter, the laser beam passed through the half-wave plate 81 is separated into P polarized light and S polarized light by the first polarization beam splitter 82. The P polarized light obtained by the first polarization beam splitter 82 is reflected by the first mirror 83 to enter the second polarization beam splitter 85. On the other hand, the S polarized light obtained by the first polarization beam splitter 82 is reflected by the second mirror 84 to enter the second polarization beam splitter 85. The P polarized light and the S polarized light thus incident on the second polarization beam splitter 85 are made parallel by the second polarization beam splitter 85 to travel on different optical paths extending in the same direction.

The first to third branching units 80a to 80c are configured above. Accordingly, the laser beam oscillated by the pulsed laser beam oscillating means 6 is first branched into P polarized light and S polarized light by the first branching unit 80a. The P polarized light emerging from the first branching unit 80a is further branched into P polarized light and S polarized light by the second branching unit 80b, and the S polarized light emerging from the first branching unit 80a is further branched into P polarized light and S polarized light by the second branching unit 80b. Each P polarized light emerging from the second branching unit 80b is further branched into P polarized light and S polarized light by the third branching unit 80c, and each S polarized light emerging from the second branching unit 80b is further branched into P polarized light and S polarized light by the third branching unit 80c. In this manner, the laser beam oscillated by the pulsed laser beam oscillating means 6 is branched into a beam of P polarized light and a beam of S polarized light by the first branching unit 80a, next branched into two beams of P polarized light and two beams of S polarized light by the second branching unit 80b, and finally branched into four beams of P polarized light and four beams of S polarized light by the third branching unit 80c. Thus, the laser beam oscillated by the pulsed laser beam oscillating means 6 is branched into eight laser beams by the first to third branching units 80a to 80c, and these eight laser beams are focused by the focusing objective lens 71 of the focusing means 7. Each of the first to third branching units 80a to 80c constituting the laser beam branching mechanism 8 further includes first angle adjusting means 830 for adjusting the angle of reflection of the P polarized light to be reflected by the first mirror 83 and second angle adjusting means 840 for adjusting the angle of reflection of the S polarized light to be reflected by the second mirror 84. In this preferred embodiment, each of the first and second angle adjusting means 830 and 840 is provided by a pulse motor and controlled by control means to be hereinafter described.

Figure 4:
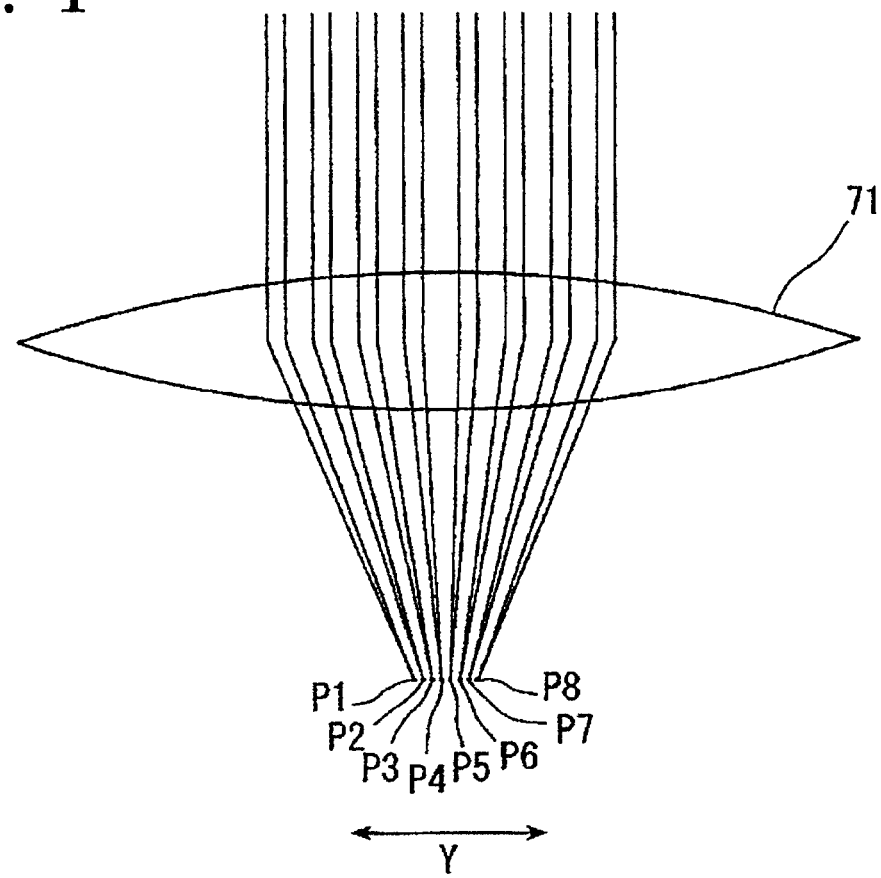
FIG. 4 is a schematic diagram for illustrating a plurality of laser beams to be applied by the laser beam applying means shown in FIG. 2.

While the first and second angle adjusting means 830 and 840 are used to adjust the angles of reflection of both the P polarized light and the S polarized light to be reflected by the first and second mirrors 83 and 84, respectively, in this preferred embodiment, the angle of reflection of at least one of the P polarized light and the S polarized light to be reflected by the first and second mirrors 83 and 84 may be adjusted. In this manner, the first and second angle adjusting means 830 and 840 each provided by a pulse motor in this preferred embodiment are used to adjust the angles of reflection of the P polarized light and the S polarized light to be reflected by the first and second mirrors 83 and 84, respectively, so that the eight laser beams emerging from the third branching unit 80c are focused at different focal points P1 to P8 by the focusing objective lens 71 as shown in FIG. 4. In this preferred embodiment, the focal points P1 to P8 of the laser beams to be focused by the focusing objective lens 71 are arranged at given intervals in the Y direction. The intervals of the focal points P1 to P8 of the laser beams to be focused by the focusing objective lens 71 can be adjusted by operating the first and second angle adjusting means 830 and 840 to change the angles of reflection of the P polarized light and the S polarized light to be reflected by the first and second mirrors 83 and 84, respectively.

Referring back to FIG. 2, the laser processing apparatus 1 includes a focused spot interval monitor unit 9 for checking the intervals of the focal points P1 to P8 of the laser beams to be focused by the focusing objective lens 71. The focused spot interval monitor unit 9 includes a semitransparent mirror 91 provided on an optical path between the third branching unit 80c and the focusing means 7, a bandpass filter 92 for passing light having a wavelength corresponding to the wavelength of the laser beams reflected by the semitransparent mirror 91, an image forming lens 93 for imaging the laser beams passed through the bandpass filter 92, and a CCD camera 94 for detecting the focal points (focused spots) of the laser beams imaged by the image forming lens 93. The focused spot interval monitor unit 9 is operated in the following manner. The eight laser beams composed of four beams of P polarized light and four beams of S polarized light obtained by the first to third branching units 80a to 80c are reflected by the semitransparent mirror 91 and passed through the bandpass filter 92 to enter the image forming lens 93. The eight laser beams thus incident on the image forming lens 93 are imaged as the focal points P1 to P8 by the image forming lens 93 as by the focusing objective lens 71. The focal points P1 to P8 thus imaged are detected by the CCD camera 94. Thereafter, the focal points p1 to P8 detected by the CCD camera 94 are sent to control means (not shown) and then displayed by display means (not shown), both of which are to be hereinafter described. The semitransparent mirror 91 is preferably configured to selectively take an operational position set on the optical path and a retracted position retracted from the optical path.

Referring back to FIG. 1, imaging means 12 for detecting a subject area of the workpiece to be laser-processed by the laser beam applying means 52 is provided at the front end portion of the casing 521 constituting the laser beam applying means 52. The imaging means 12 includes illuminating means for illuminating the workpiece, an optical system for capturing an area illuminated by the illuminating means, and an imaging device (CCD) for imaging the area captured by the optical system. An image signal output from the imaging means 12 is transmitted to control means 10 shown in FIG. 6.

Figure 5:
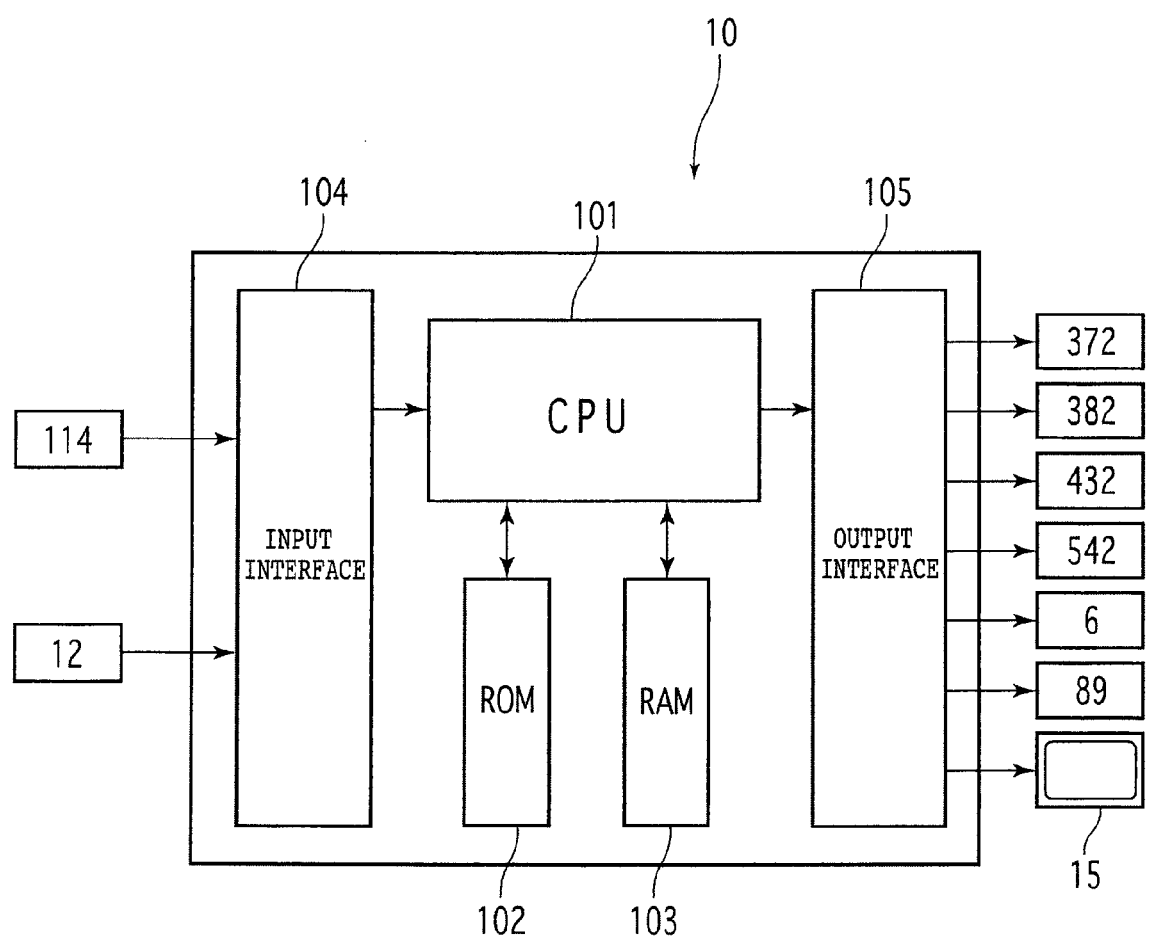
FIG. 5 is a block diagram showing the configuration of control means included in the laser processing apparatus shown in FIG. 1.

The laser processing apparatus 1 includes the control means 10 shown in FIG. 5. The control means 10 includes a central processing unit (CPU) 101 for performing operational processing according to a control program, a read only memory (ROM) 102 preliminarily storing the control program, a random access memory (RAM) 103 for storing the results of computation, etc., an input interface 104, and an output interface 105. Detection signals from the CCD camera 114 of the focused spot interval monitor unit 11 and the imaging means 12 are input into the input interface 104 of the control means 10. On the other hand, control signals are output from the output interface 105 of the control means 10 to the pulse motor 372 of the feeding means 37, the pulse motor 382 of the first indexing means 38, the pulse motor 432 of the second indexing means 43, the pulse motor 542 of the focal position adjusting means 54, the pulsed laser beam oscillating means 6 of the laser beam applying means 52, the pulse motor 89 of the spread angle adjusting means 80, and display means 15.

Figure 6A:
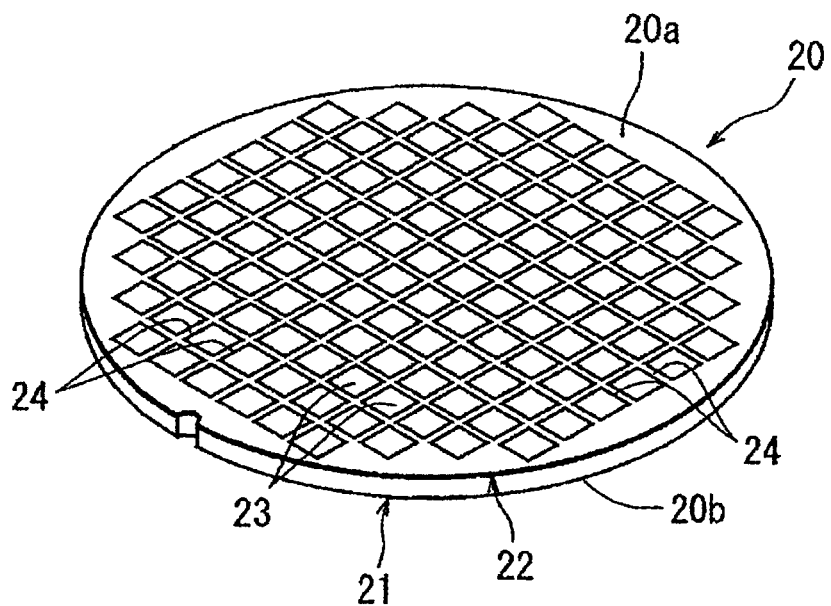
FIG. 6A is a perspective view of a semiconductor wafer as a workpiece.
Figure 6B:
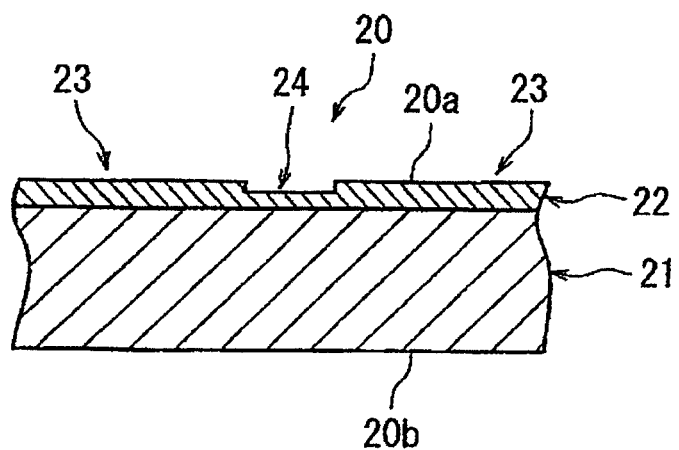
FIG. 6B is an enlarged sectional view of an essential part of the semiconductor wafer shown in FIG. 6A.

The operation of the laser processing apparatus 1 configured above will now be described. FIG. 6A is a perspective view of a semiconductor wafer 20 as the workpiece, and FIG. 6B is an enlarged sectional view of an essential part of the semiconductor wafer 20 shown in FIG. 6A. As shown in FIGS. 6A and 6B, the semiconductor wafer 20 is composed of a semiconductor substrate 21 such as a silicon substrate and a multilayer film 22 formed on the front side of the semiconductor substrate 21. The multilayer film 22 is composed of an insulating film and a functional film formed on the insulating film, the functional film forming a plurality of circuits. A plurality of devices 23 such as ICs and LSIs are formed like a matrix by the multilayer film 22. These devices 23 are partitioned by a plurality of crossing streets 24 formed on the multilayer film 22. In this preferred embodiment, the insulating film constituting the multilayer film 22 is provided by an SiO2 film or a low-permittivity insulator film (Low-k film). Examples of the Low-k film include an inorganic film of SiOF, BSG (SiOB), etc. and an organic film such as a polymer film of polyimide, parylene, etc. There will now be described a method of forming a laser processed groove on the multilayer film 22 along each street 24 of the semiconductor wafer 20.

Figure 7A:
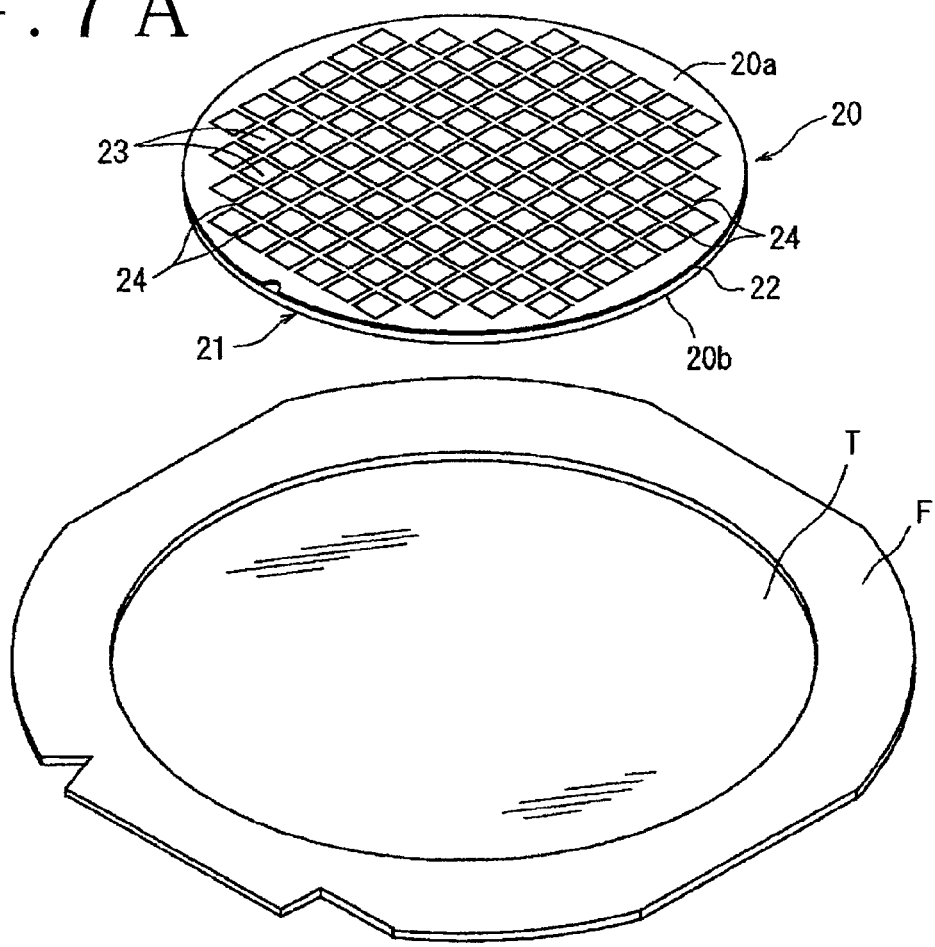
FIGS. 7A and 7B are perspective views for illustrating a step of attaching the semiconductor wafer shown in FIG. 6A to a protective tape supported to an annular frame.
Figure 7B:
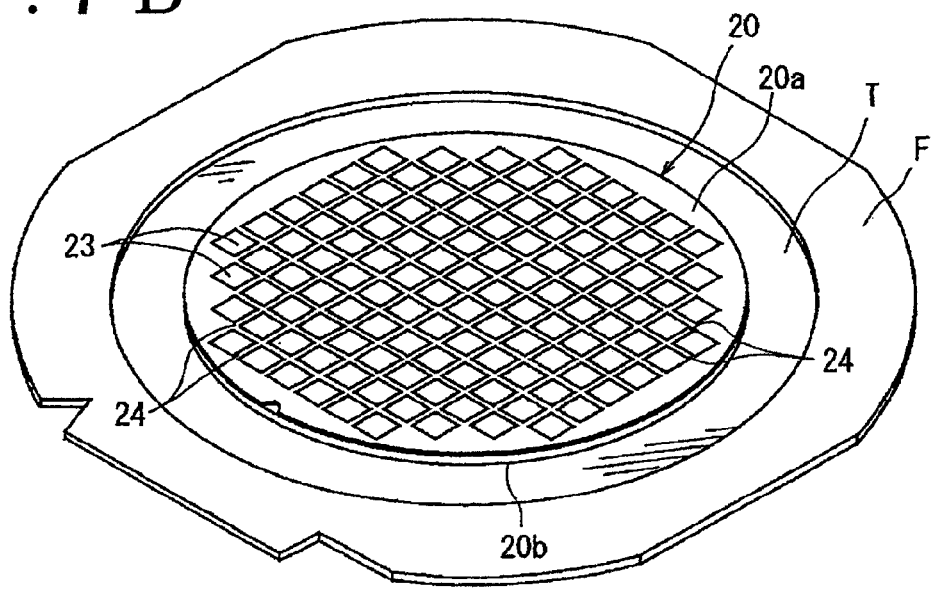

Prior to dividing the semiconductor wafer 20 along each street 24, the semiconductor wafer 20 is attached to a protective tape T supported to an annular frame F as shown in FIGS. 7A and 7B. More specifically, the back side 20b of the semiconductor wafer 20 is attached to the protective tape T in the condition where the front side 20a of the semiconductor wafer 20 is oriented upward. Thereafter, a laser beam applying step is performed in such a manner that a laser beam is applied along each street 24 of the semiconductor wafer 20 to thereby remove the multilayer film 22 present on each street 24. First, the semiconductor wafer 20 supported through the protective tape T to the annular frame F is placed on the chuck table 36 of the laser processing apparatus 1 shown in FIG. 1 in the condition where the front side 20a of the semiconductor wafer 20 is oriented upward. In this condition, the suction means (not shown) is operated to thereby hold the semiconductor wafer 20 through the protective tape T on the chuck table 36 under suction. Accordingly, the semiconductor wafer 20 is held on the chuck table 36 in the condition where the front side 20a of the semiconductor wafer 20 is oriented upward. Further, the annular frame F supporting the semiconductor wafer 20 through the protective tape T is fixed by the clamps 362.

Thereafter, the feeding means 37 is operated to move the chuck table 36 holding the semiconductor wafer 20 under suction to a position directly below the imaging means 12. In the condition where the chuck table 36 is positioned directly below the imaging means 12, the control means 10 operates the imaging means 12 to perform an alignment operation for detecting a subject area of the semiconductor wafer 20 to be laser-processed. More specifically, the imaging means 12 and the control means 10 perform image processing such as pattern matching for making the alignment of the streets 24 extending in a first direction on the semiconductor wafer 20 and the focusing means 7 of the laser beam applying means 52 for applying the laser beam along the streets 24, thus performing the alignment of a laser beam applying position. The imaging means 12 and the control means 10 similarly perform the alignment operation for the other streets 24 extending in a second direction perpendicular to the first direction mentioned above on the semiconductor wafer 20.

Figure 8A:
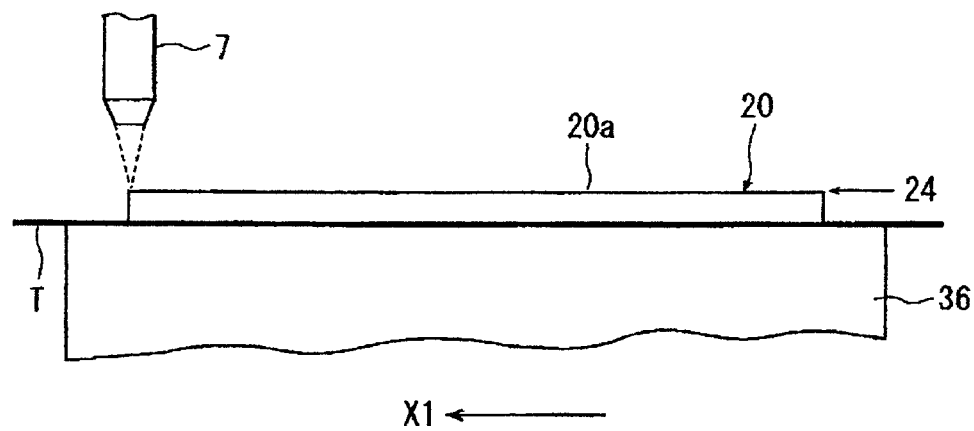
FIGS. 8A to 8C are views for illustrating a laser beam applying step of forming a laser processed groove along each street on the semiconductor wafer shown in FIG. 6A by using the laser processing apparatus shown in FIG. 1.
Figure 8B:
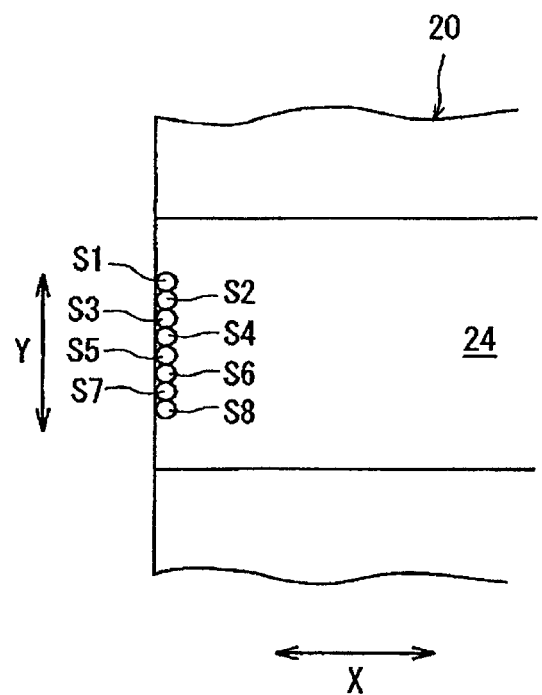

After performing the alignment operation to detect all of the streets 24 formed on the semiconductor wafer 20 held on the chuck table 36, the chuck table 36 is moved in the X direction and the Y direction so that one end (left end as viewed in FIG. 8A) of a predetermined one of the streets 24 extending in the first direction is positioned directly below the focusing means 7 as shown in FIG. 8A. FIG. 8B is an enlarged plan view showing this condition, wherein S1 to S8 denote eight focused spots at the focal points P1 to P8 of the eight laser beams to be applied from the focusing means 7. As shown in FIG. 8B, these focused spots S1 to S8 are arranged along the width of this predetermined street 24. Further, the focal position adjusting means 54 is operated to adjust the height of the laser beam applying means 52 so that the focused spots S1 to S8 of the eight laser beams are formed on the front side (upper surface) of this predetermined street 24.

Figure 8C:
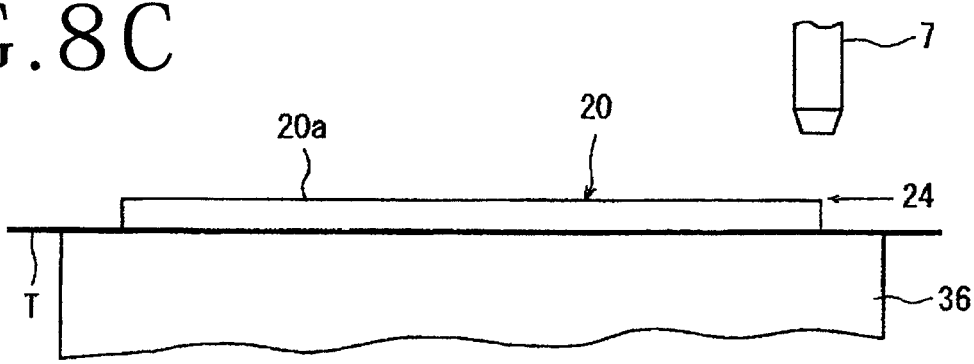

Thereafter, the laser beam applying means 52 is operated to apply the eight laser beams having an absorption wavelength to the semiconductor wafer 20 from the focusing means 7, and the chuck table 36 is moved in the direction shown by an arrow X1 in FIG. 8A at a predetermined feed speed (laser beam applying step). When the other end (right end as viewed in FIG. 8C) of the predetermined street 24 reaches the position directly below the focusing means 7 as shown in FIG. 8C, the application of the laser beams from the focusing means 7 is stopped and the movement of the chuck table 36 is also stopped.

For example, the laser beam applying step is performed under the following processing conditions.

Figure 9:
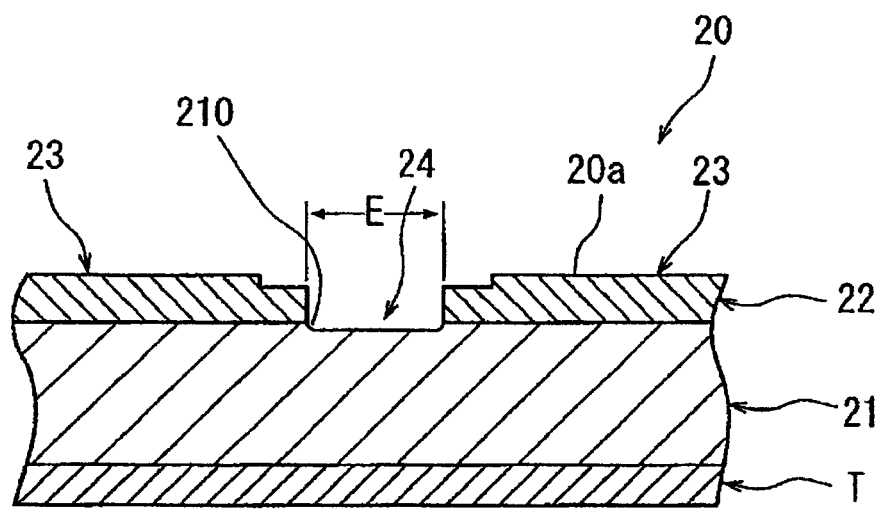
FIG. 9 is an enlarged sectional view of the laser processed groove formed on the semiconductor wafer by performing the laser beam applying step shown in FIGS. 8A to 8C.

Light source of laser beam: YVO4 laser or YAG laser
Wavelength: 355 nm
Power: 10 W
Repetition frequency: 100 kHz
Pulse width: 1 ns
Focused spot diameter: 5 μm
Work feed speed: 100 mm/s By setting the condition that the focused spots S1 to S8 each having a focused spot diameter of 5 μm as mentioned above are in contact with each other as shown in FIG. 8B, a laser processed groove 210 having a width (E) of 40 μm and a depth greater than the thickness of the multilayer film 22 present on the predetermined street 24 is formed along this street 24 by the eight laser beams as shown in FIG. 9. The intervals of the focused spots S1 to S8 may be easily adjusted by operating the first and second angle adjusting means 830 and 840 to change the angles of reflection of the P polarized light and the S polarized light to be reflected by the first and second mirrors 83 and 84 and to be incident on the second polarization beam splitter 85, respectively. The laser beam applying step mentioned above is similarly performed for all of the other streets 24 formed on the semiconductor wafer 20. After forming the laser processed groove 210 along each street 24, the semiconductor wafer 20 is transported to a cutting apparatus for performing a dividing step.

In this preferred embodiment, the laser processing apparatus 1 is used to apply the laser beams having an absorption wavelength to the workpiece, thereby performing ablation to form the laser processed groove 210 along each street 24. However, the laser processing apparatus according to the present invention is also applicable to the case of applying laser beams having a transmission wavelength to the workpiece in the condition where the focal points of the laser beams are set inside the workpiece, thereby forming a modified layer inside the workpiece.

Further, while the focal points P1 to P8 of the laser beams are arranged in the Y direction perpendicular to the feeding direction (X direction) in this preferred embodiment, the focal points P1 to P8 of the laser beams may be arranged in the feeding direction (X direction) depending on the processing conditions.

In the case that the maximum range between the first focal point and the last focal point constituting the plural focal points of the laser beams is about 150 μm, a general convex lens may be used as the focusing objective lens 71 of the focusing means 7. However, in the case that this maximum range is 1 mm or more, an fθ lens or an image-side telecentric lens is preferably used.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus comprising:
   a chuck table for holding a workpiece;
   laser beam applying means for applying a laser beam to said workpiece held on said chuck table, said laser beam applying means including laser beam oscillating means for oscillating a laser beam, focusing means for focusing said laser beam oscillated by said laser beam oscillating means and applying said laser beam focused to said workpiece held on said chuck table, and a laser beam branching mechanism provided between said laser beam oscillating means and said focusing means for branching said laser beam oscillated by said laser beam oscillating means into a plurality of laser beams; and
   feeding means for relatively moving said chuck table and said laser beam applying means in a feeding direction;
   said laser beam branching mechanism including a branching unit for branching said laser beam oscillated by said laser beam oscillating means into said plurality of laser beams;
   said branching unit including a half-wave plate for 45° rotating the polarization plane of said laser beam oscillated by said laser beam oscillating means, a first polarization beam splitter for separating said laser beam passed through said half-wave plate into P polarized light and S polarized light, a first mirror for reflecting said P polarized light obtained by said first polarization beam splitter, a second mirror for reflecting said S polarized light obtained by said first polarization beam splitter, a second polarization beam splitter for leading said P polarized light reflected by said first mirror and said S polarized light reflected by said second mirror to different optical paths extending in the same direction, and angle adjusting means for adjusting the angle of reflection of at least one of said P polarized light and said S polarized light to be reflected by said first and second mirrors;
   whereby the angle of reflection of at least one of said P polarized light and said S polarized light to be reflected by said first and second mirrors is adjusted by said angle adjusting means to thereby adjust the spacing between the focal points of said plurality of laser beams formed by said P polarized light and said S polarized light to be focused by said focusing means.

2. The laser processing apparatus according to claim 1, wherein said laser beam branching mechanism includes a plurality of branching units, said P polarized light and said S polarized light passed through the upstream one of said plurality of branching units being 45° rotated in polarization plane by said half-wave plate of the next one of said plurality of branching units, said P polarized light in said next branching unit being further branched into P polarized light and S polarized light to be introduced into said focusing means, said S polarized light in said next branching unit being further branched into P polarized light and S polarized light to be introduced into said focusing means.

* * * * *